Patented Oct. 7, 1930

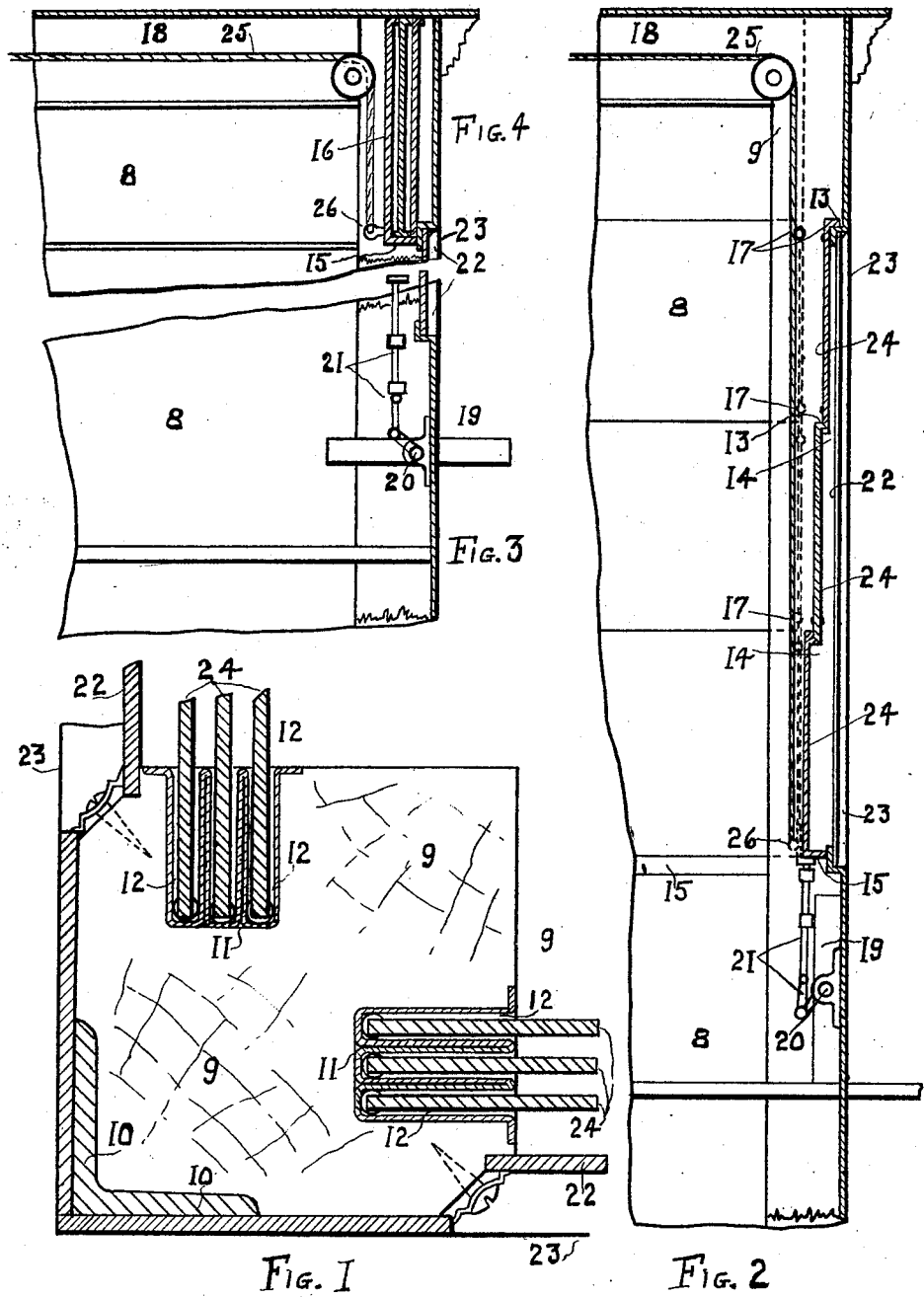

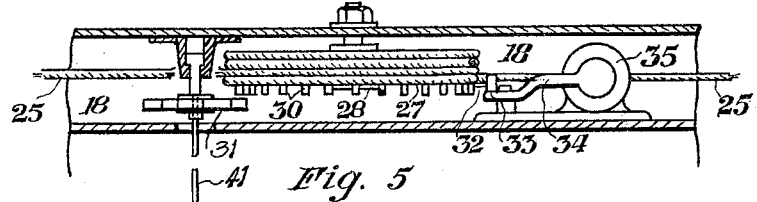
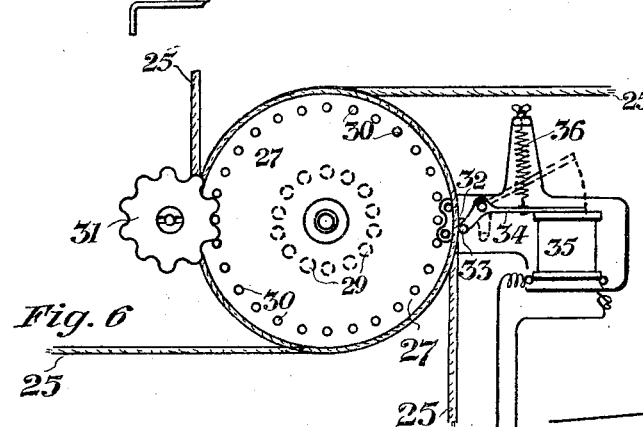
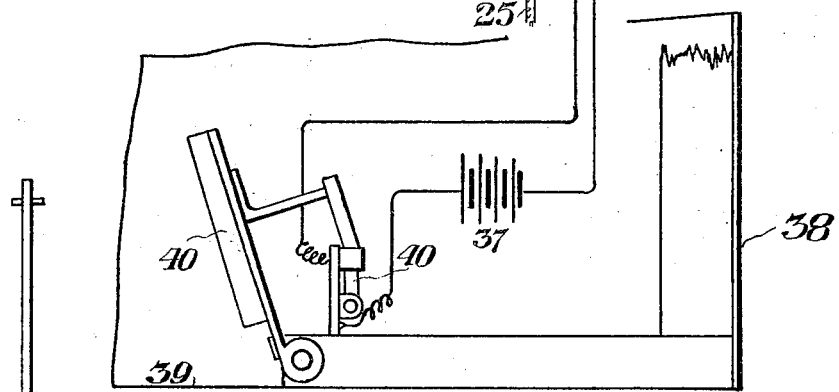

1,777,760

UNITED STATES PATENT OFFICE

GEORGE MURRAY, OF VANCOUVER, BRITISH COLUMBIA, CANADA

OPERATING DEVICE FOR BANK-TELLERS'-CAGE SHIELDS

Application filed December 22, 1926. Serial No. 156,407.

This invention relates to a shielding device for the protection of bank tellers from attack by bandits. Its object is the provision of a teller's cage which differs little in appearance from one of ordinary design but which, upon the operation of a foot switch, will immediately render the cage practically shot-proof.

This instantaneous armouring or shielding device consists of a multiple shutter on each of the four sides suspended behind and hidden by the cornice around the top of the cage.

Each group of shutters is normally held up by a steel cable which is wound around a four grooved pulley, the latter being held by a magnetic clutch, or other form of electrically operated trigger, so that upon the breaking or opening of the electric circuit the shutters are free to descend and instantly render the cage armour-plated on all four sides.

The invention is fully described in the following specification, reference being made to the accompanying drawings forming part of this application in which:

Figure 1 is a cross section of one of the corner posts of the cage.

Figure 2 is a vertical section through one wall of the cage from the cornice to below the table.

Figure 3 is a part vertical section showing the wicket shelf in its normal horizontal position.

Figure 4 is a vertical section of the top of the cage with the shutters in the raised position.

Figure 5 is a part sectional view through the false roof of the cage, where the shutter sustaining and releasing gear is located and hidden.

Figure 6 is a plan view of the mechanism shown in Figure 5, and

Figure 7 is an elevation of the foot switch in the teller's cage with the electric connections shown in diagram between it and the release gear in the preceding figure.

Figure 8 is an elevation of the crank handle by which the overhead cable drum is wound up.

Taking the drawings in detail and noting that similar numerals in the different views indicate identical parts I desire it to be understood that the construction shown is merely one method of carrying out my invention and I wish to be bound by the precise details shown only in so far as they fall within the scope of the claims.

The inner side of the cage is denoted by 8, the corner post by 9, the latter being reinforced by the vertical angle-iron 10, and grooved at 11 to receive the shutter guides 12.

The shutters (in this case three) are each lipped in opposite directions along the top edge 13 and the bottom edge 14 as shown, for the purpose of interlinking and uniting them. The bottom edge 15 of the lowest shutter is, however, lipped in the same direction as the top edge and the projection is wide enough to cover both the edges of the two shutters above it. These it also engages successively as it is elevated to the raised position at the top of the cage as shown at 16.

In order to facilitate the rapidity of action anti-friction devices are made use of wherever possible, steel balls being fixed in the edges of the shutters as shown at 17, to run in the guides 12. A false ceiling 18 at the top of the cage houses the sustaining and releasing gear shown in Fig. 5 and Fig. 6. The usual wicket shelf is indicated at 19. This is made pivotable at 20, the pivot rod being extended to the corner of the cage where a simple sliding rod and link device 21 utilizes the falling shutters to close the wicket and hold the shelf in vertical position as shown in Fig. 2. If necessary this may be accentuated by a spring and catch. For the sake of clearness the vertical guides 12 are not shown in the Fig. 2 in which figure the glass face which is of the toughened or non-splintering type is indicated by 22 and the metal open work or grille by 23.

The shutters 24 are raised by a fine wire cable 25, one being secured to each group at 26, the opposite end fastened to the four grooved drum 27. This latter is suspended from the ceiling of the cage by the vertical bearing 28 and runs on a horizontal ball bearing 29. On the underside of the drum are projecting studs 30 which are engaged by the teeth of the vertically slidable pinion 31 which is normally out of gear but when operated by the crank 41 through the ceiling from below slides upward in its bearing and gears with the studs 30.

The releasing gear consists of a radially projecting stud 32 on the lower edge of the periphery of the drum 27, which engages and is held by a friction roller 33 on the short arm of the lever 34, the extremity of the long arm of which forms an armature to the magnetic coil 35 which holds the lever and the drum 27 against the action of the helical spring 36 as long as the electric current from the battery 37 energizes the coil 35.

Figure 7 indicates the lower portion of the cage, the front of which is shown at 38 and the floor at 39. A foot switch 40 of ample leverage and size affords a ready means of interrupting the circuit by the teller without observation, and the frictionless character of the device throughout ensures that the shutters instantly operate.

What I claim is:

Means for operating vertically slidable shields protecting a bank teller's cage and comprising, a winding drum having circumferential grooves corresponding to the number of said separate slidable shields, a cable in each groove secured to said drum and trained over anti-friction devices and having its other extremity secured to one of said shields, a pinion adaptable to engage and mesh with the periphery of said drum, means for manually revolving said pinion, a projection on the periphery of said winding drum, a lever of the first order having its short arm provided with an anti-friction roller adapted to engage the said projection and having its long arm adapted to form the armature of an electromagnet, an electromagnet adapted to attract and normally retain the said armature, a spring member secured to the said lever and adapted to oppose the attraction of said magnet and release said short arm from engagement with said projection, means under the control of said teller for interrupting the circuit forming the said electromagnet and so permitting the said shields to drop by their own weight and revolve the said drum.

In testimony whereof I affix my signature.

GEORGE MURRAY.